(12) United States Patent
Drye et al.

(10) Patent No.: US 8,981,684 B2
(45) Date of Patent: Mar. 17, 2015

(54) HUMAN-MACHINE INTERFACE FOR MOTOR CONTROL

(75) Inventors: Edward L. Drye, Troy, OH (US); Howard R. Richardson, Troy, OH (US); Stephen T. English, Englewood, OH (US)

(73) Assignee: Regal Beloit America, Inc., Beloit, WI (US)

(*) Notice: Subject to any disclaimer, the term of this patent is extended or adjusted under 35 U.S.C. 154(b) by 0 days.

(21) Appl. No.: 13/285,624

(22) Filed: Oct. 31, 2011

(65) Prior Publication Data

US 2013/0106321 A1    May 2, 2013

(51) Int. Cl.
| | |
|---|---|
| B23Q 35/00 | (2006.01) |
| H02K 5/22 | (2006.01) |
| H02K 9/14 | (2006.01) |
| H02K 11/00 | (2006.01) |

(52) U.S. Cl.
CPC .................. *H02K 5/225* (2013.01); *H02K 9/14* (2013.01); *H02K 11/0073* (2013.01)
USPC ........................................................ 318/162

(58) Field of Classification Search
None
See application file for complete search history.

(56) References Cited

U.S. PATENT DOCUMENTS

| | | | |
|---|---|---|---|
| 4,322,297 A | 3/1982 | Bajka | |
| 4,421,643 A | 12/1983 | Frederick | |
| 4,424,438 A | 1/1984 | Antelman et al. | |
| 4,505,643 A | 3/1985 | Millis et al. | |
| 4,780,917 A | 11/1988 | Hancock | |
| 5,117,233 A | 5/1992 | Hamos et al. | |
| 5,278,455 A | 1/1994 | Hamos | |
| 5,559,720 A | 9/1996 | Tompkins et al. | |
| 5,730,861 A | 3/1998 | Sterghos et al. | |
| 6,079,950 A | 6/2000 | Seneff | |
| 6,091,604 A | 7/2000 | Plougsgaard et al. | |
| 6,676,831 B2 | 1/2004 | Wolfe | |
| 6,747,367 B2 | 6/2004 | Cline et al. | |
| 6,900,736 B2 | 5/2005 | Crumb | |
| 7,030,343 B2 | 4/2006 | Tran | |
| 7,397,360 B2 | 7/2008 | Corrington et al. | |
| 7,484,938 B2 | 2/2009 | Allen | |
| 7,686,589 B2 | 3/2010 | Stiles, Jr. et al. | |
| 7,854,597 B2 | 12/2010 | Stiles, Jr. et al. | |
| 7,874,808 B2 | 1/2011 | Stiles | |
| 7,931,447 B2 | 4/2011 | Levin et al. | |
| 8,043,070 B2 * | 10/2011 | Stiles et al. | .................. 417/44.1 |
| 8,248,009 B2 * | 8/2012 | Campbell et al. | ......... 318/400.05 |
| 8,319,466 B2 * | 11/2012 | Valdez et al. | ................. 318/434 |
| 2005/0194461 A1 | 9/2005 | Goldberg et al. | |

(Continued)

OTHER PUBLICATIONS

United States Patent Office Action for U.S. Appl. No. 13/285,741 dated Feb. 15, 2013 (10 pages).

(Continued)

*Primary Examiner* — Shawki S Ismail
*Assistant Examiner* — Zoheb Imtiaz
(74) *Attorney, Agent, or Firm* — Michael Best & Friedrich LLP

(57) ABSTRACT

A motor assembly includes an electric motor having a stator and a rotor. A housing is coupled to the electric motor. A motor controller is disposed within the housing. A human machine interface (HMI) is selectively detachably coupled to the housing and in communication with the motor controller. The HMI includes a user input for control of the electric motor when the HMI is coupled to the housing and for control of the electric motor when the HMI is separately disposed from the housing.

12 Claims, 7 Drawing Sheets

(56) References Cited

U.S. PATENT DOCUMENTS

| | | |
|---|---|---|
| 2005/0258809 A1 | 11/2005 | Karslo |
| 2005/0260079 A1 | 11/2005 | Allen |
| 2007/0154323 A1 | 7/2007 | Stiles, Jr. et al. |
| 2007/0217290 A1 | 9/2007 | Rock |
| 2008/0045904 A1* | 2/2008 | Estes et al. ............ 604/152 |
| 2009/0261661 A1 | 10/2009 | Finneran |
| 2010/0079096 A1* | 4/2010 | Braun et al. ............ 318/494 |
| 2010/0230510 A1 | 9/2010 | Wilson |
| 2010/0310382 A1 | 12/2010 | Kidd et al. |
| 2011/0044823 A1 | 2/2011 | Stiles |
| 2011/0052416 A1 | 3/2011 | Stiles |
| 2011/0091329 A1 | 4/2011 | Stiles, Jr. et al. |
| 2012/0013285 A1* | 1/2012 | Kasunich et al. ....... 318/490 |
| 2012/0100010 A1* | 4/2012 | Stiles et al. ............ 417/44.1 |
| 2012/0206078 A1 | 8/2012 | Norell et al. |
| 2013/0106322 A1 | 5/2013 | Drye et al. |

OTHER PUBLICATIONS

United States Patent Office Final Rejection for U.S. Appl. No. 13/285,741 dated May 23, 2013 (10 pages).

United States Patent Office Final Rejection for U.S. Appl. No. 13/285,741 dated Feb. 26, 2014 (12 pages).

United States Patent Office Action for U.S. Appl. No. 13/285,741 dated Oct. 24, 2013 (14 pages).

United States Patent Office Action for U.S. Appl. No. 13/285,741 dated Jun. 24, 2014 (12 pages).

* cited by examiner

HUMAN-MACHINE INTERFACE FOR MOTOR CONTROL

BACKGROUND

The invention relates to electric motors. More specifically, the invention relates to a human-machine interface for electric motors.

Pump motors, such as for swimming pools, are often installed in locations that simplify plumbing and connections to related equipment. These installation locations often provide limited access to the pump motor due to the proximity of walls or other structures. Limited access may make it difficult or potentially unsafe to program the timer control device.

SUMMARY

In one embodiment, the invention provides a motor assembly including an electric motor having a stator and a rotor. A housing is coupled to the electric motor. A motor controller is disposed within the housing. A human machine interface (HMI) is selectively detachably coupled to the housing and in communication with the motor controller. The HMI includes a user input for control of the electric motor when the HMI is coupled to the housing and for control of the electric motor when the HMI is separately disposed from the housing.

In another embodiment, the invention provides a motor assembly. An electric motor includes a stator housing, a stator disposed in the stator housing, and a rotor rotatably coupled to the stator housing for rotation with respect to the stator. A motor control module includes a controller housing coupled to the stator housing, a motor controller disposed within the controller housing, and an input terminal in communication with the motor controller. A human machine interface (HMI) includes an HMI housing, a display, a user input member, and a mounting member for selectively detachably coupling the HMI housing to the controller housing. An interface cord connects the HMI to the input terminal and communicates commands from the user input member to the motor controller.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
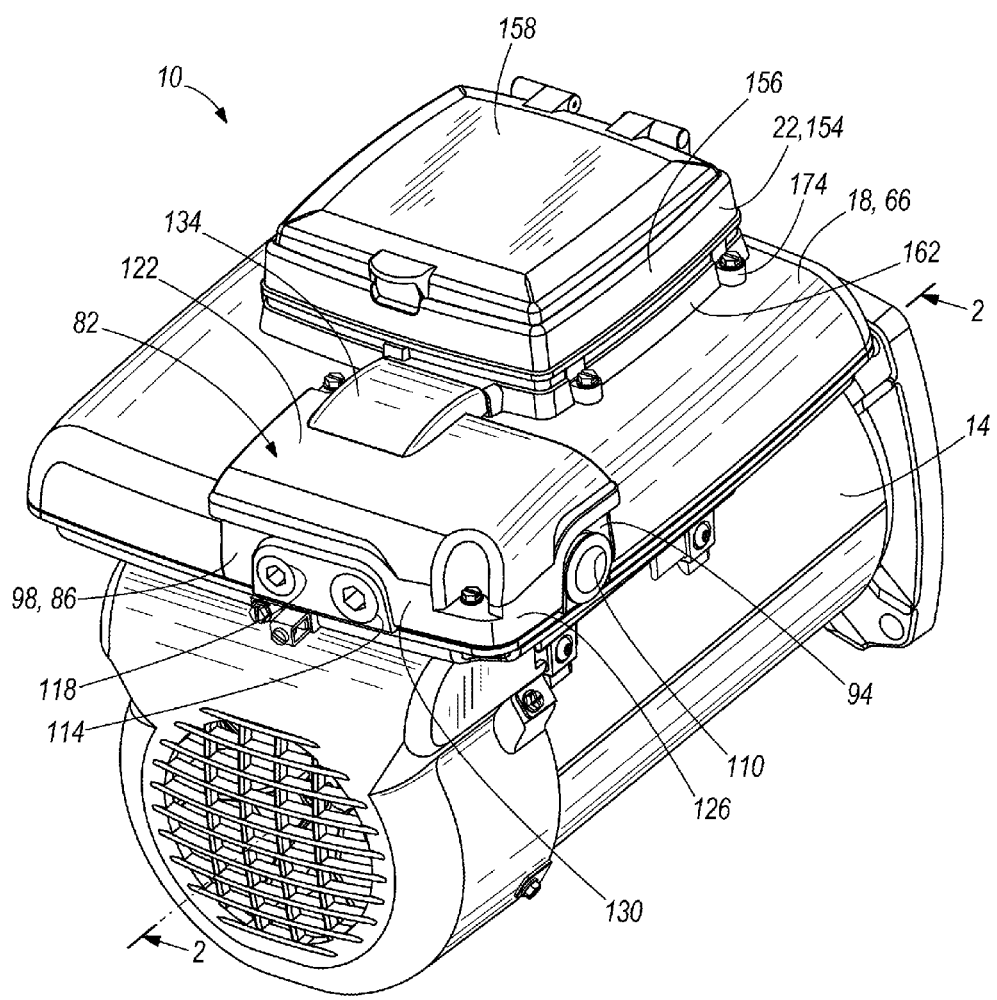
FIG. 1 is a perspective view of a motor assembly.

FIG. 1 illustrates a motor assembly 10, such as for use with a pump. The motor assembly 10 includes an electric motor 14, a motor control module 18, and a human machine interface (HMI) 22. The motor assembly 10 may be, for example, an electronically controlled, variable speed pump motor.

Figure 2:
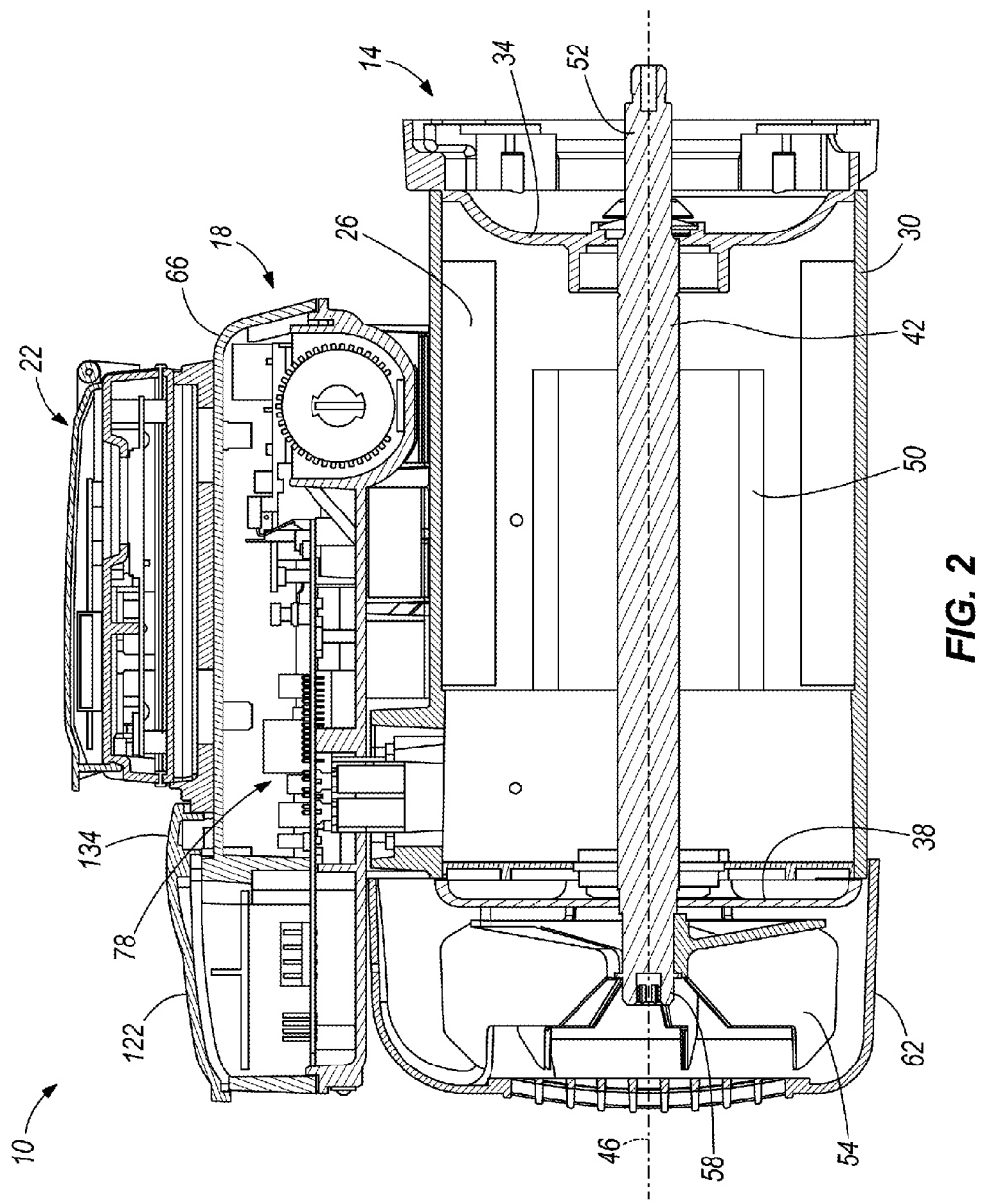
FIG. 2 is a cross sectional view along section line 2-2 of the motor assembly of FIG. 1.

Referring to FIG. 2, the electric motor 14 includes a stator 26 disposed within a stator housing 30. A first end frame 34 and a second end frame 38 are coupled to the stator housing 30. A rotor shaft 42 is rotatably coupled to the first end frame 34 and the second end frame 38 for rotation about an axis 46 within the stator 26. The rotor shaft 42 supports a rotor 50. The rotor 50 is operable to rotate with respect to the stator 26 as a result of applying a current through windings of the stator 26. A load end 52 of the rotor shaft 42, adjacent the first end frame 34, may be coupled to a pump or other load to be driven. A fan 54 is fixedly coupled to a fan end 58 of the rotor shaft 42, adjacent the second end frame 38. The fan 54 is disposed within a fan housing 62.

Figure 5:
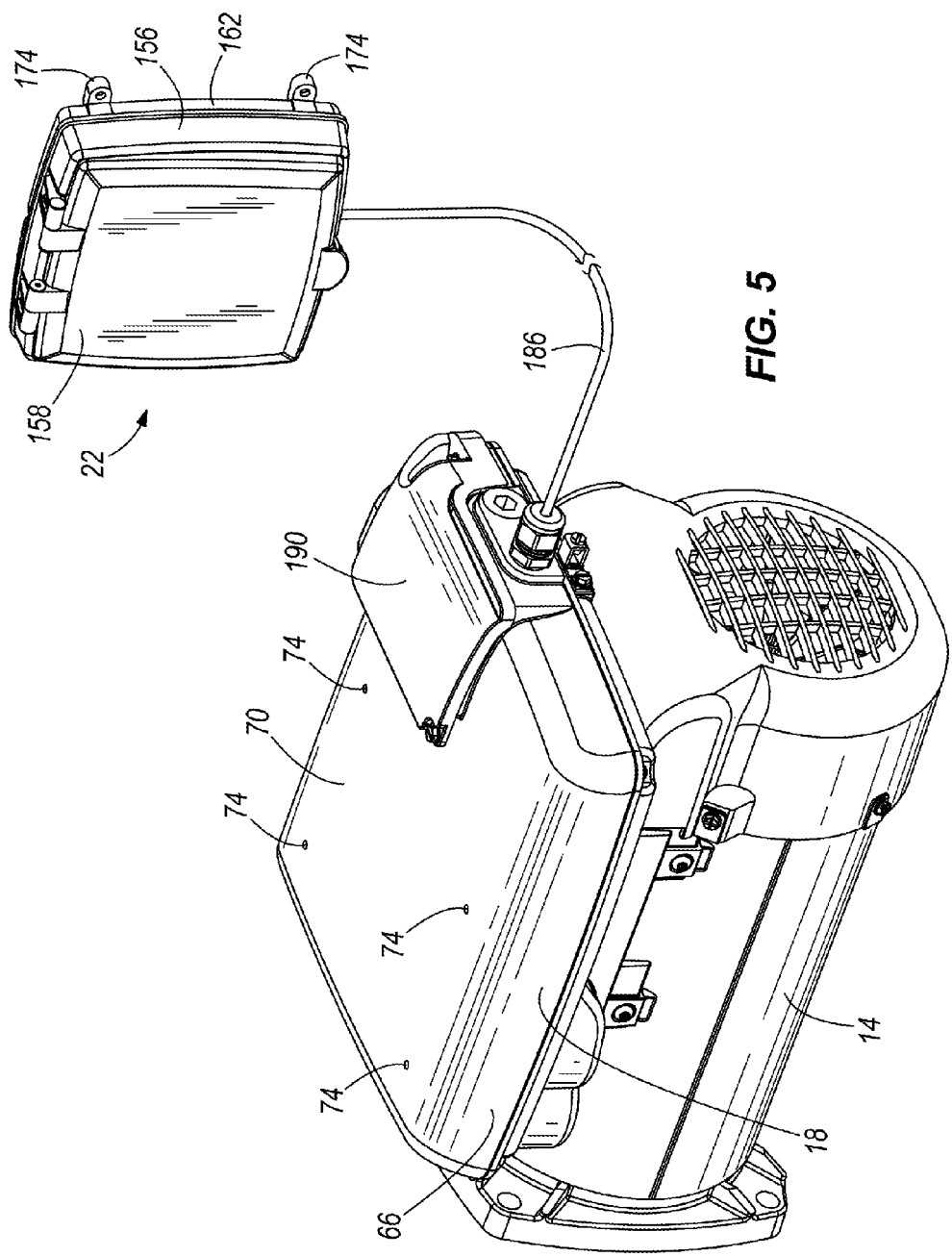
FIG. 5 is a perspective view of a motor assembly with a human-machine interface remotely disposed.

As shown in FIG. 1, the control module 18 includes a controller housing 66. Referring to FIG. 5, planar surface 70 of the controller housing 66 defines four threaded apertures 74. Referring to FIG. 2, a motor controller 78 is disposed within the controller housing 66. The motor controller 78 may include a printed circuit board (PCB) as well as power electronics and overload circuitry that is integral to, or coupled to, the PCB.

Figure 3:
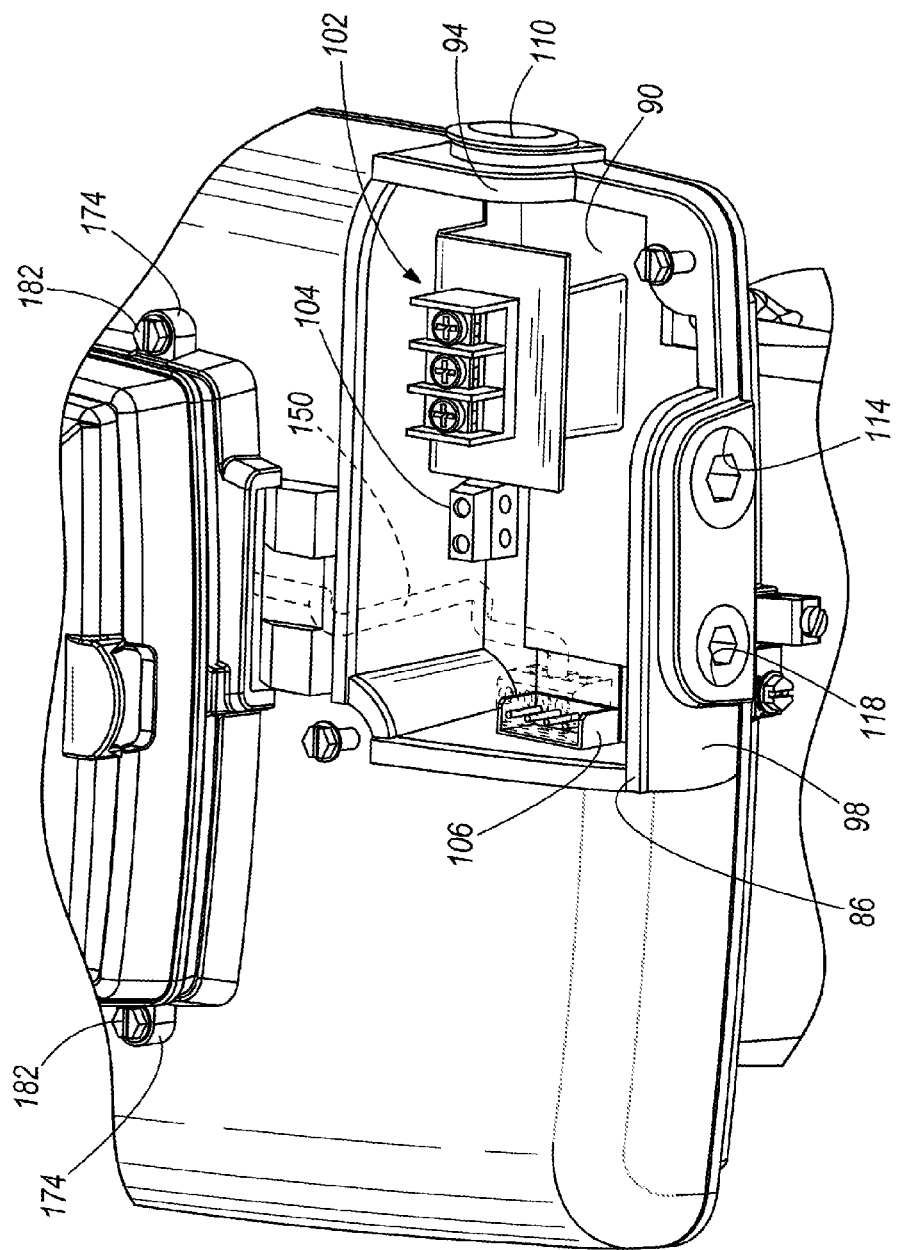
FIG. 3 is a perspective of a portion of the motor assembly of FIG. 1, with a terminal cover removed.
Figure 7:
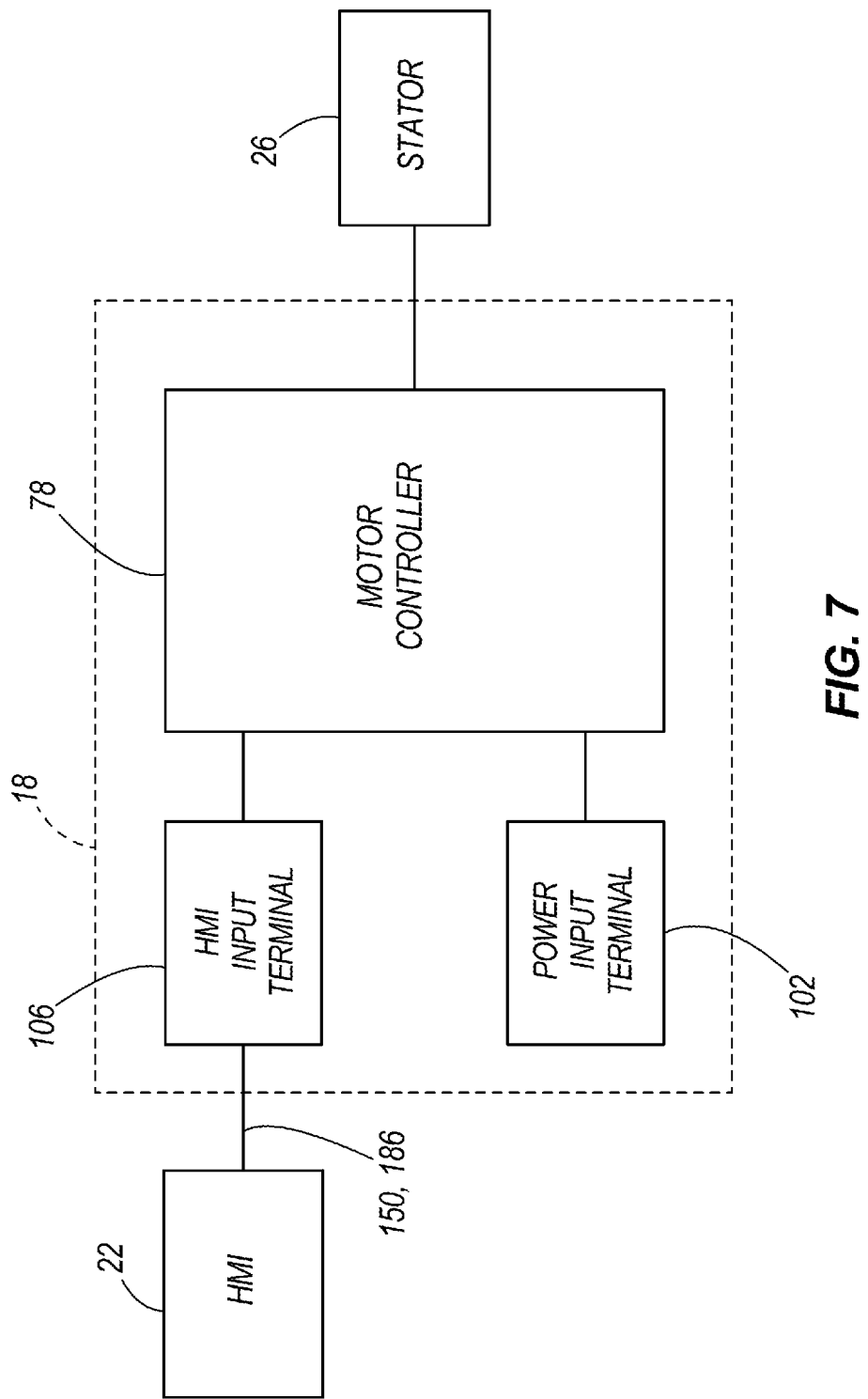
FIG. 7 is a block diagram of the motor assembly.

Referring back to FIG. 1, a terminal cover 82 is coupled to a terminal housing portion 86 of the controller housing 66. FIG. 3 illustrates the terminal housing portion 86 with the terminal cover 82 removed. The terminal housing portion 86 includes a base wall 90, a first lateral wall 94, and a second lateral wall 98. Power input terminals 102, an auxiliary load terminal 104, and an HMI input terminal 106 are coupled to the base wall. As shown in FIG. 7, the power input terminal 102 and HMI input terminal 106 are connected to the motor controller 78. Referring back to FIG. 3, the first lateral wall 94 defines a first aperture 110 for receiving power input leads. The second lateral wall 98 defines a second aperture 114 for receiving power input leads. The first aperture 110 and the second aperture 114 are provided in order for a user or installer to have options in routing power connections. The second lateral wall 98 also defines a third aperture 118.

Figure 4:
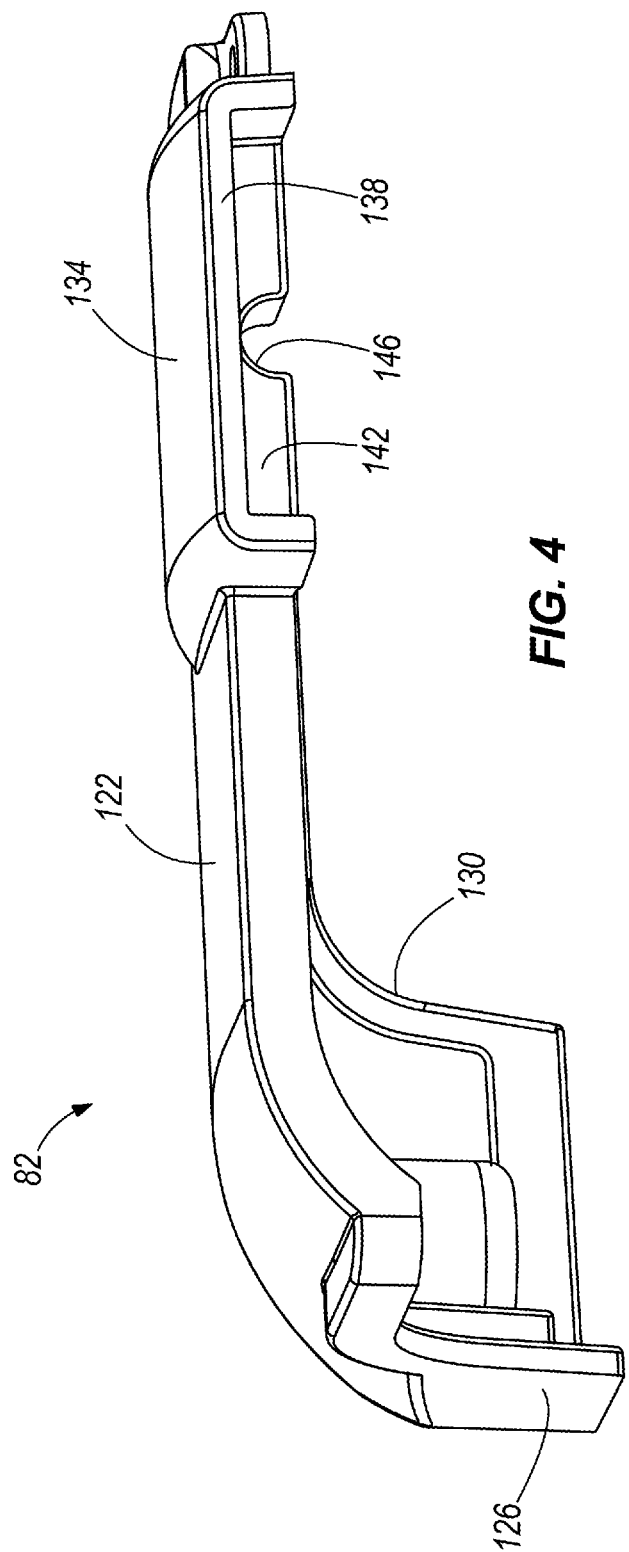
FIG. 4 is a perspective view of a terminal cover.

Referring back to FIG. 1, the terminal cover 82 includes a wall 122. The wall defines a first lateral edge 126 contoured to engage the first lateral wall 94, and a second lateral edge 130 contoured to engage the second lateral wall 98. An interface shield 134 extends from the wall 122 towards the HMI 22. Referring to FIG. 4, which illustrates the terminal cover 82 from a substantially opposite perspective of that in FIG. 1, the interface shield 134 includes a hood portion 138 and a lip portion 142. The lip portion 142 defines a semi-circular arch 146. When the terminal cover is coupled to the terminal portion 86, the arch 146 provides an aperture between terminal cover 82 and the controller housing 66 in order to route an interface cord 150 (FIG. 3) from the HMI 22 into the terminal housing portion 86, to connect the HMI 22 to the HMI input terminal 106 (FIG. 3).

Figure 6:
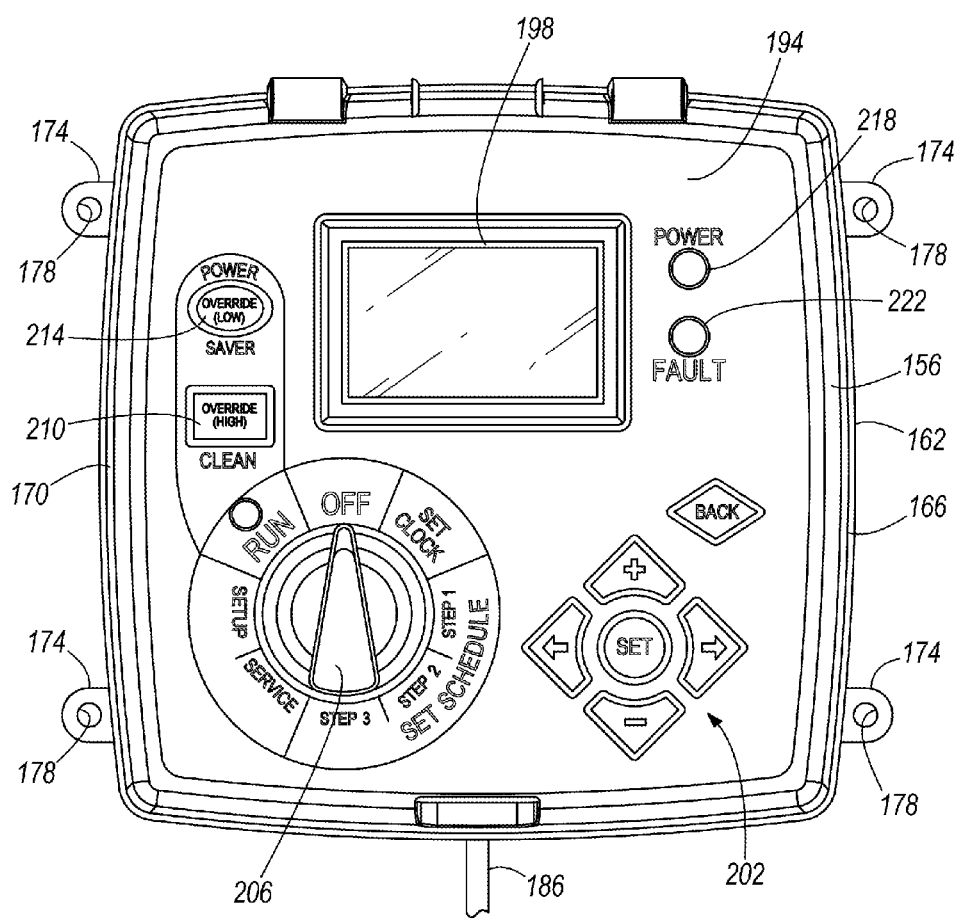
FIG. 6 is a top view of the human machine interface.

Referring back to FIG. 1, the HMI 22 includes an HMI housing assembly 154. The HMI housing assembly 154 includes an HMI base housing 156, an HMI cover 158, and an HMI mounting plate 162. The HMI mounting plate 162 is configured to receive the HMI base housing 156 and to couple the HMI base housing 156 to the controller housing 66. The HMI mounting plate 162 is generally in the shape of the HMI base housing 156, with a first sidewall 166 and a second sidewall 170. As best illustrated in FIG. 6, the HMI mounting plate 162 includes four foot members 174. Two foot members 174 extend from the first sidewall 166, while two more foot members 174 extend from the second sidewall 170. Each foot member 174 defines an aperture 178. The foot members 174 and apertures 178 are arranged in order to substantially align with the threaded apertures 74 of the controller housing 66 for mounting the HMI 22 to the control module 18. As shown in FIG. 3, threaded fasteners 182 are provided in order to couple the HMI 22, via the HMI mounting plate 162, to the controller housing 66.

Referring now to FIG. 5, the HMI 22 may be detached from the controller housing 66 and mounted in a location remote from electric motor 14 and control module 18, such as an adjacent wall or nearby wall. The foot members 174 may be used, in conjunction with application-appropriate fasteners, to attach the HMI 22 to a wall or other surface. The short interface cord 150, illustrated in FIG. 3, is exchanged for a longer interface cord 186 of FIG. 5, with a length of the longer interface cord 186 being dependent upon the mounting location. In contrast to the interface cord 150 of FIG. 3, which passed between the terminal cover 82 and the controller housing 66, the interface cord 186 passes through the third aperture 118 of the terminal housing portion.

Optionally, the terminal cover 82 of FIGS. 1, 2 and 4 may be exchanged for a terminal cover 190 of FIG. 5. The terminal cover 190 lacks the interface shield 134 and arch 146 (FIG. 4) of the terminal cover 82. The terminal cover 190 provides greater weather resistance to the terminal housing portion 86 when the HMI 22 is remotely disposed.

FIG. 6 illustrates the HMI 22 with the HMI cover 158 detached. A control and display face 194 of the HMI 22 includes a display screen 198, program entry and selection buttons 202, and a rotatable switch 206. The display screen 198 may include, for example, a liquid crystal display, for displaying program parameters such as speed and time. The rotatable switch 206 provides a visual indication of a timer function to be accessed or programmed by the user via the program entry and selection buttons 202. A high speed program override button 210 and a low speed program override button 214 are provided in order to override a current program setting and to command the electric motor to run at a prescribed high speed or low speed for a prescribed length of time. A power light 218 provides visual indication of power availability. A fault light 222 provides visual indication of a fault in the HMI or controller.

FIG. 7 is a block diagram of the motor assembly 10, showing the interrelationships of the HMI 22, the motor controller 78, and the stator 26. Further discussion regarding an exemplary control of a motor 14, pump system, and pool system is described in U.S. patent application Ser. No. 13/285,524, filed on even date herewith, the entire content of which is incorporated herein by reference.

Thus, the invention provides, among other things, a new and useful motor assembly with a detachable human machine interface. Various features and advantages of the invention are set forth in the following claims.

What is claimed is:

1. A motor assembly comprising:
an electric motor including a stator and a rotor;
a controller housing coupled to the electric motor;
a motor controller disposed within the controller housing;
a terminal housing portion coupled to the controller housing and defining a first interface aperture, the terminal housing portion and the controller housing cooperating to define a second interface aperture;
a human machine interface (HMI) selectively coupled to the controller housing and decoupled from the controller housing and in communication with the motor controller when either coupled to the controller housing or decoupled from the controller housing, the HMI including a user input for control of the electric motor when the HMI is coupled to the controller housing and for user control of the electric motor when the HMI is separately disposed from the controller housing;
a first interface cord selectively connected to the HMI and the controller, the first interface cord passing through the first interface adapter when the HMI is decoupled from the controller housing;
a second interface cord selectively connected to the HMI and the controller, the second interface cord passing through the second interface aperture when the HMI is coupled to the controller housing; wherein one and only one of the first interface cord and the second interface cord are connected between the HMI and the controller during operation of the motor assembly.

2. The motor assembly of claim 1, wherein the HMI includes a display screen.

3. The motor assembly of claim 1, further comprising a terminal cover coupled to the terminal housing portion.

4. The motor assembly of claim 1, wherein the user input includes a program entry button.

5. The motor assembly of claim 4, wherein the user input includes a program override button.

6. The motor assembly of claim 1, wherein the HMI includes a fault indicator.

7. A motor assembly, comprising:
a stator;
a rotor interacting with the stator to rotate with respect to the stator to drive a pump;
a controller housing coupled to the stator and operable to cover at least a portion of the stator;
a motor controller disposed within the controller housing;
a terminal housing portion coupled to the controller housing and defining a first interface aperture, the terminal housing portion and the controller housing cooperating to define a second interface aperture and a power input aperture;
an input terminal positioned in the terminal housing portion and electrically coupled to the motor controller;
a human machine interface (HMI) selectively coupled to the controller housing and decoupled from the controller housing, the HMI including a user input for control of the electric motor when the HMI is coupled to the controller housing and for user control of the electric motor when the HMI is separately disposed from the controller housing;
a first interface cord selectively connected to the HMI and the input terminal, the first interface cord passing through the first interface adapter when the HMI is decoupled from the controller housing;
a second interface cord selectively connected to the HMI and the input terminal, the second interface cord passing through the second interface aperture when the HMI is coupled to the controller housing, wherein one and only one of the first interface cord and the second interface cord are connected between the HMI and the controller during operation of the motor assembly; and
a single power cord passing through the power input aperture and operable to provide power to the motor and the HMI.

8. The motor assembly of claim 7, wherein the HMI includes a display screen.

9. The motor assembly of claim 7, further comprising a terminal cover coupled to the terminal housing portion.

10. The motor assembly of claim 7, wherein the user input includes a program entry button.

11. The motor assembly of claim 10, wherein the user input includes a program override button.

12. The motor assembly of claim 7, wherein the HMI includes a fault indicator.

\* \* \* \* \*